United States Patent
Su et al.

(10) Patent No.: US 7,338,846 B2
(45) Date of Patent: Mar. 4, 2008

(54) FABRICATING METHOD OF PIXEL STRUCTURE

(75) Inventors: Ta-Jung Su, Chunghua County (TW); Yea-Chung Shih, Yunlin County (TW); Cheng-Fang Su, Taipei County (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 119 days.

(21) Appl. No.: 11/306,814

(22) Filed: Jan. 12, 2006

(65) Prior Publication Data

US 2007/0161136 A1    Jul. 12, 2007

(51) Int. Cl.
*H01L 21/84* (2006.01)

(52) U.S. Cl. .............. 438/158; 257/E29.291; 257/E21.414

(58) Field of Classification Search .......... 438/158, 438/FOR. 200, FOR. 183; 257/E29.291, 257/E29.294, E21.205, 21.414

See application file for complete search history.

(56) References Cited

U.S. PATENT DOCUMENTS 6,927,087 B2 *   8/2005   Lai .................. 438/29

FOREIGN PATENT DOCUMENTS

TW            588462         5/2004

* cited by examiner

*Primary Examiner*—George R. Fourson
*Assistant Examiner*—Julio J Maldonado
(74) *Attorney, Agent, or Firm*—Jianq Chyun IP Office (57) ABSTRACT

A method for fabricating a pixel structure is provided. First, a gate, a scan line, and a first terminal are formed on a substrate. A gate insulating layer is formed over the substrate to cover the gate, the scan line, and the first terminal. After defining the semiconductor layer, the gate insulating layer is patterned to expose the first terminal. A transparent conductive layer is formed over the substrate and a patterned photoresist layer is formed on the transparent conductive layer. The transparent conductive layer is patterned using the patterned photoresist layer as a mask, so as to define a source, a drain, a data line, a pixel electrode, a second terminal, and a contact pad. Because only four photomasks are used to implement the above method for fabricating the pixel structure, the cost of manufacturing can be reduced.

16 Claims, 8 Drawing Sheets

FABRICATING METHOD OF PIXEL STRUCTURE

BACKGROUND OF THE INVENTION

1. Field of Invention

The present invention relates to a method for fabricating a pixel structure. More particularly, the present invention relates to a method for fabricating a pixel structure requiring less photomasks.

2. Description of Related Art

A thin film transistor liquid crystal display (TFT-LCD) consists of a thin film transistor array substrate, a color filter array substrate, and a liquid crystal layer, and the thin film transistor array substrate consists of a plurality of thin film transistors (TFTs) arranged in an array and the pixel electrodes configured corresponding to each of the TFTs. The above TFT includes a gate, a semiconductor layer, a source, and a drain. The TFT and the pixel electrode constitute a pixel structure. The TFT acts as a switching element for the liquid crystal display unit.

When fabricating a TFT, the most important consideration is to reduce the number of process steps, thereby reducing the manufacturing costs. Especially, if the number of photomasks required by the process steps can be reduced, the manufacturing costs can be significantly reduced.

Figure 1A:
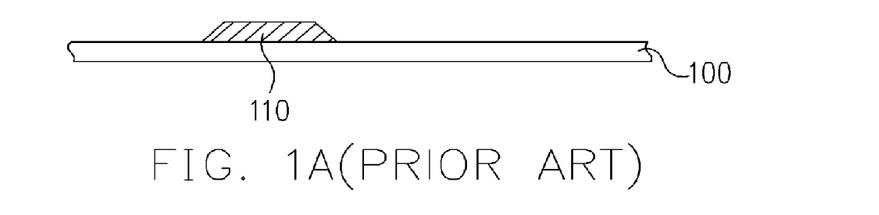
FIGS. 1A-1G are schematic cross-sectional views of processing steps of a method for fabricating a conventional pixel structure.
Figure 1B:
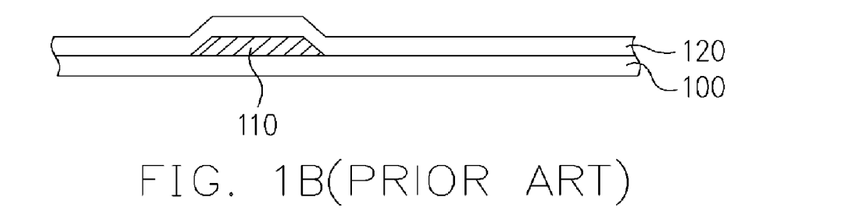

FIGS. 1A-1G are schematic cross-sectional views of processing steps of a conventional method for fabricating a pixel structure. Referring to FIG. 1A, first, a gate 110 is defined on a substrate 100 using a first photomask (not shown). Next, referring to FIG. 1B, a gate insulating layer 120 is formed on the substrate 100 to cover the gate 110.

Figure 1C:
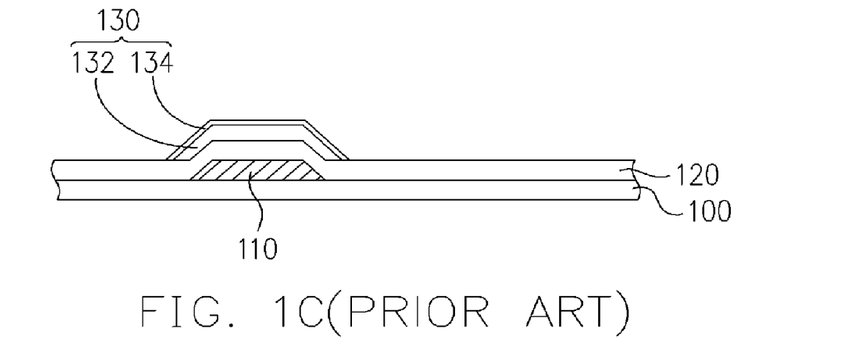
Figure 1D:
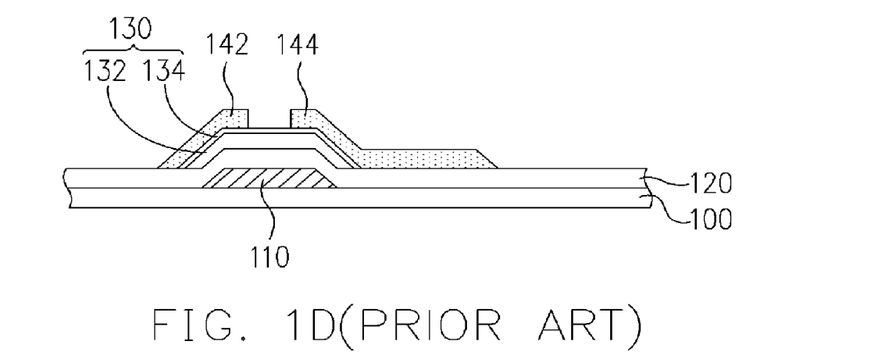
Figure 1E:
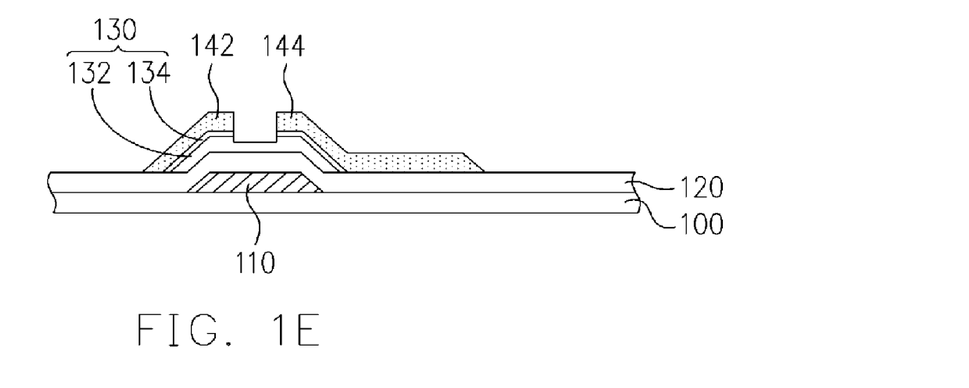

Then, referring to FIG. 1C, a semiconductor layer 130 is defined on the gate insulating layer 120 above the gate 110 using a second photomask (not shown), and the semiconductor layer 130 includes a channel layer 132 and an ohmic contact layer 134. Then, referring to FIG. 1D, a metal layer (not shown) is formed on the substrate 100, and a source 142 and a drain 144 are defined through a third photomask (not shown). Particularly, at this time, a back channel etching (BCE) process is carried out to remove the ohmic contact layer 134 sandwiched between the source 142 and the drain 144, as shown in FIG. 1E.

Figure 1F:
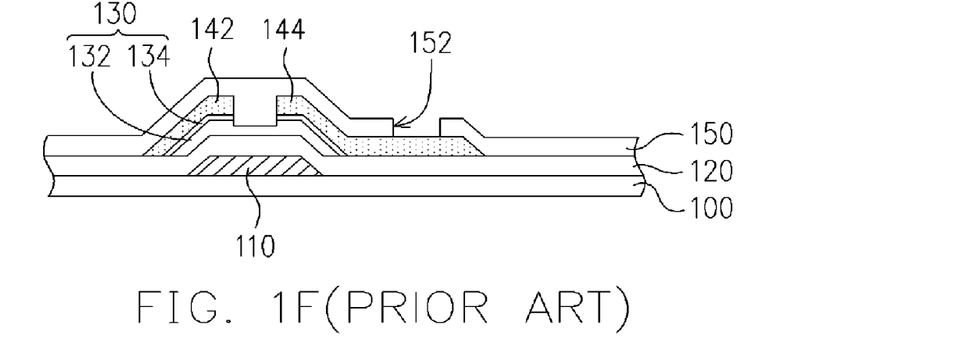
Figure 1G:
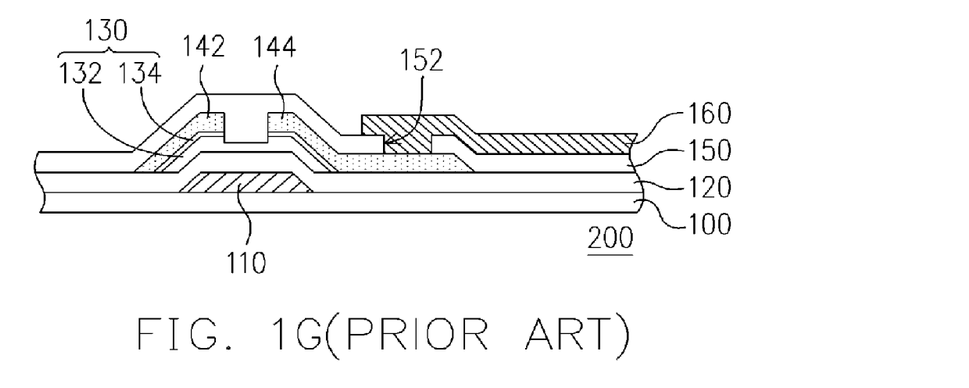

Then, referring to FIG. 1F, a protective layer 150 is formed over the substrate 100, and the protective layer 150 is patterned using a fourth photomask (not shown), and the protective layer 150 has an opening 152 exposing the drain 144. Afterwards, a transparent conductive layer (not shown) is formed over the substrate 100. A pixel electrode 160 is defined through a fifth photomask (not shown), and is electrically connected to the drain 144 through the opening 152. Thus, the pixel structure 200 is completed.

Generally, five photomasks are required for patterning by the conventional fabricating processes for the pixel structure 200. Therefore, it is desirable to reduce the number of photomasks required for the fabricating processes, so as to lower the manufacturing costs.

SUMMARY OF THE INVENTION

Accordingly, an object of the present invention is to provide a method for fabricating a pixel structure, which can reduce the number of required photomasks, thereby reducing the manufacturing costs of.

Another object of the present invention is to provide a pixel structure with lower manufacturing costs.

In order to achieve the above or other objects, the present invention provides a method for fabricating a pixel structure. The method comprises the following steps: forming a gate, a scan line, and a first terminal on a substrate, wherein the scan line is electrically connected with the gate, and the first terminal is electrically connected with the scan line at an edge of the substrate; forming a gate insulating layer on the substrate for covering the gate, the scan line, and the first terminal; defining a semiconductor layer on the gate insulating layer above the gate; patterning the gate insulating layer to expose the first terminal; forming a transparent conductive layer over the substrate; forming a patterned photoresist layer on the transparent conductive layer; patterning the transparent conductive layer using the patterned photoresist layer as a mask, so as to define a source, a drain, a data line electrically connected with the source, a pixel electrode electrically connected with the drain, a second terminal electrically connected with the data line, and a contact pad electrically connected with the first terminal.

In an embodiment of the present invention, the above semiconductor layer includes a channel layer and an ohmic contact layer.

In an embodiment of the present invention, after the above step of patterning the transparent conductive layer, a step of removing the ohmic contact layer sandwiched between the source and the drain is further included.

In an embodiment of the present invention, after the above step of removing the ohmic contact layer sandwiched between the source and the drain, a step of forming a protective layer over the substrate is further included.

In an embodiment of the present invention, the material of the above protective layer includes silicon dioxide, silicon nitride, or silicon oxynitride.

In an embodiment of the present invention, after the above step of forming a protective layer over the substrate, a step of removing both the patterned photoresist layer and the protective layer covered on the patterned photoresist layer is further included.

In an embodiment of the present invention, the above method for forming a gate, a scan line, and a first terminal on the substrate includes the following steps: first, forming a metal layer on the substrate; forming a first patterned photoresist layer on the metal layer; carrying out an etch process using the first patterned photoresist layer as a mask, so as to define the gate, the scan line, and the first terminal.

In an embodiment of the present invention, the material of the above metal layer is the one selected form the group consisting of Cr, W, Ta, Ti, Mo, Al, and any combination thereof.

In an embodiment of the present invention, the above method for forming a gate insulating layer on the substrate includes the chemical vapor deposition (CVD) process.

In an embodiment of the present invention, the material of the above gate insulating layer includes silicon dioxide, silicon nitride, or silicon oxynitride.

In an embodiment of the present invention, the above method for defining a semiconductor layer on the gate insulating layer above the gate includes the following steps: sequentially forming a channel material layer and an ohmic contact material layer on the gate insulating layer; forming a second patterned photoresist layer for covering the channel material layer and the ohmic contact material layer on the gate insulating layer above the gate; using the second patterned photoresist layer as a mask, removing the ohmic contact material layer and the channel material layer uncovered by the second patterned photoresist layer.

In an embodiment of the present invention, the above method for removing the ohmic contact material layer and the channel material layer uncovered by the second patterned photoresist layer includes wet etching or dry etching.

In an embodiment of the present invention, the above method for patterning the gate insulating layer to expose the first terminal includes the following steps: forming a third patterned photoresist layer over the substrate, wherein the third patterned photoresist layer has an opening exposing the gate insulating layer above the first terminal; using the third patterned photoresist layer as a mask, removing the part of the gate insulating layer exposed by the opening.

In an embodiment of the present invention, the above method for forming a transparent conductive layer over the substrate includes evaporation or sputtering.

In an embodiment of the present invention, the material of the above transparent conductive layer includes indium tin oxide or indium zinc oxide.

In an embodiment of the present invention, the above step of forming the gate, the scan line, and the first terminal further comprises forming a common line on the substrate as a lower electrode of a pixel storing capacitor, and the later formed pixel electrode above the common line is used as an upper electrode of the pixel storing capacitor.

In order to achieve the above or other objects, the present invention further provides a pixel structure, which comprises a substrate, a gate, a scan line, a first terminal, a gate insulating layer, a semiconductor layer, a source and a drain, a data line, a pixel electrode, a second terminal, and a contact pad. The substrate includes the gate, the scan line electrically connected with the gate, and the first terminal electrically connected with the scan line at the edge of the substrate. The gate insulating layer covers the substrate. The semiconductor layer is disposed on the gate insulating layer above the gate. The source and the drain are disposed above the gate insulating layer, and are electrically connected with the semiconductor layer. The data line is disposed above the gate insulating layer, and is electrically connected with the source. The pixel electrode is disposed above the gate insulating layer, and is electrically connected with the drain. The second terminal is disposed above the gate insulating layer, and is electrically connected with the data line. The contact pad is disposed above the gate insulating layer, and is electrically connected with the first terminal. The source, the drain, the data line, the pixel electrode, the second terminal, and the contact pad are of the same film layer.

In an embodiment of the present invention, the materials of the above source, the drain, the data line, the pixel electrode, the second terminal, and the contact pad include transparent conductive materials.

In an embodiment of the present invention, the above pixel structure further includes at least one protective layer disposed above the gate insulating layer.

In an embodiment of the present invention, the above pixel structure further includes a common line disposed on the substrate as a lower electrode of a pixel storing capacitor, and the pixel electrode above the common line is used as an upper electrode of the pixel storing capacitor.

The fabrication method of the present invention employs four photomasks, by forming the source, drain, and the pixel electrode at the same time. Compared with the conventional five-photomask process, fewer photomasks are used, the cost of the photomasks is reduced, and the process steps become simpler.

In order to more easily appreciate the above-mentioned and other objects, features, and advantages of the present invention, it is further illustrated below in great detail through the preferred embodiments, with reference to the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 2:
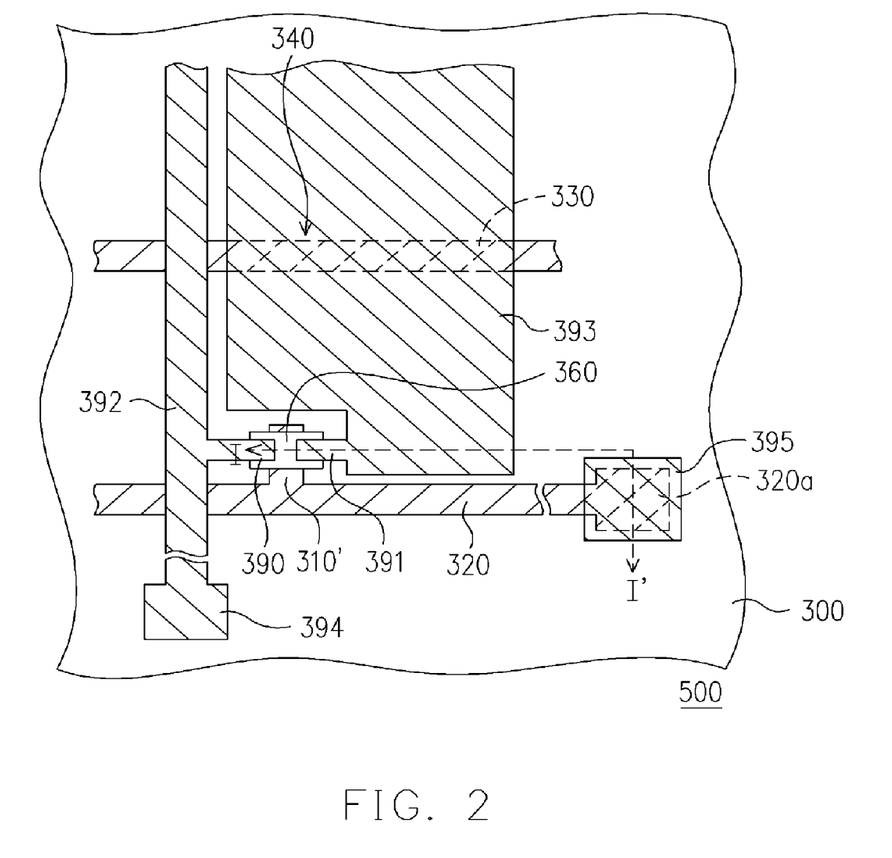
FIG. 2 is a schematic top view of a pixel structure according to a preferred embodiment of the present invention.
Figure 3A:
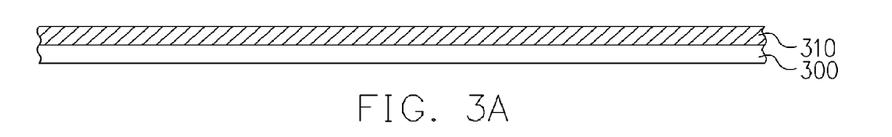
FIGS. 3A-3N are schematic cross-sectional views of processing steps of a method for fabricating a pixel structure according to a preferred embodiment of the present invention, taken along the line I-I' of FIG. 2.
Figure 3B:
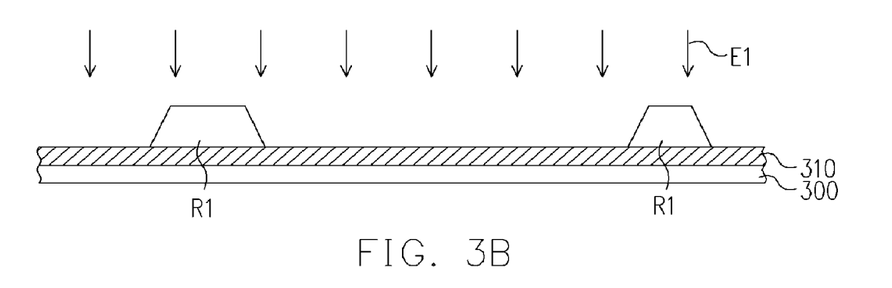
Figure 3C:
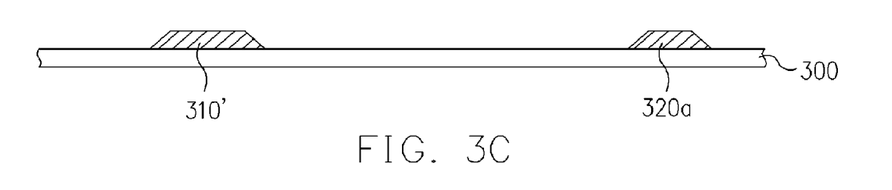

FIG. 2 is a schematic top view of a pixel structure according to a preferred embodiment of the present invention. FIGS. 3A-3N are schematic cross-sectional views of processing steps of a method for fabricating a pixel structure according to a preferred embodiment of the present invention, taken along the line I-I' of FIG. 2.

First, a gate 310', a scan line 320, and a first terminal 320a are formed on a substrate 300. The scan line 320 is electrically connected with the gate 310' and a first terminal 320a is electrically connected with the scan line 320 at the edge of a substrate 300, as shown in FIG. 2 and FIG. 3C. In a preferred embodiment, the method for forming the gate 310', the scan line 320, and the first terminal 320a on the substrate 300 includes the steps as shown in FIGS. 3A-3C.

Referring to FIG. 3A, a metal layer 310 is formed on the substrate 300. The substrate 300 is, for example, a glass substrate, a quartz substrate, or a plastic substrate. The method for forming the metal layer 310 is, for example, evaporation or sputtering, and the material of the metal layer 310 is, for example, a material selected from the group consisting of Cr, W, Ta, Ti, Mo, Al, and any combination thereof. Next, referring to FIG. 3B, a first patterned photoresist layer R1 is formed on the metal layer 310, and R1 is formed through, for example, a conventional lithographic process, which will not be described herein in details. Afterwards, an etching process E1 is carried out using the first patterned photoresist layer R1 shown in FIG. 3B as a mask, to define the gate 310', the scan line 320, and the first terminal 320a shown in FIG. 2 and FIG. 3C, wherein the first terminal 320a is subsequently used for electrically connecting with a driving circuit.

Still referring to FIG. 2, in a preferred embodiment, when forming the gate 310', the scan line 320, and the first terminal 320a, a common line 330 can also be formed on the substrate 300 as a lower electrode of a pixel storing capacitor 340, and a pixel electrode 393 subsequently formed above the common line 330 is used as an upper electrode of the pixel storing capacitor 340.

Figure 3D:
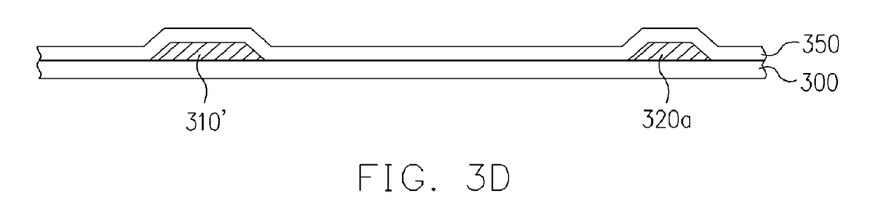

Then, a gate insulating layer 350 is formed on the substrate 300 covering the gate 310', the scan line 320 (shown in FIG. 2), and the first terminal 320a, as shown in FIG. 3D. In an embodiment of the present invention, the method for forming the gate insulating layer 350 on the substrate 300 includes the chemical vapor deposition (CVD) process, and the material of the gate insulating layer 350 is, for example, silicon dioxide, silicon nitride, or silicon oxynitride.

Figure 3E:
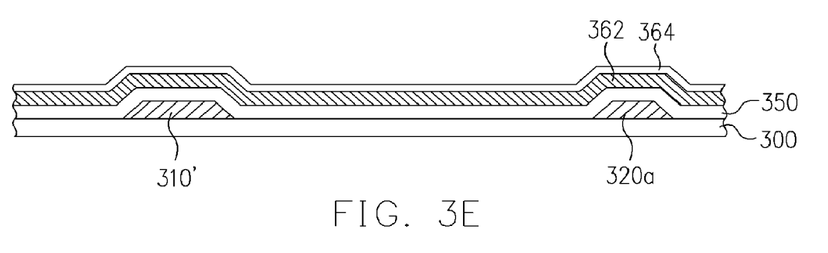
Figure 3F:
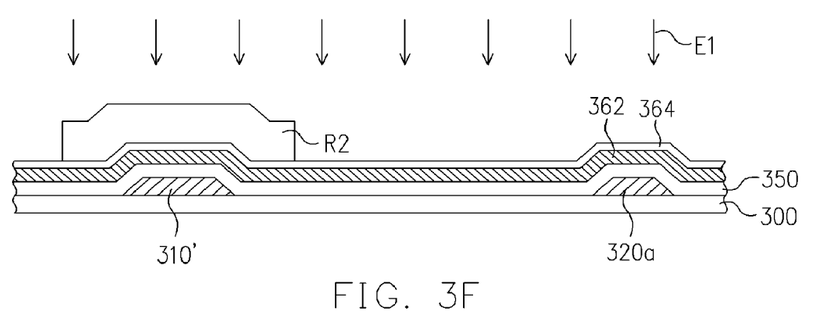
Figure 3G:
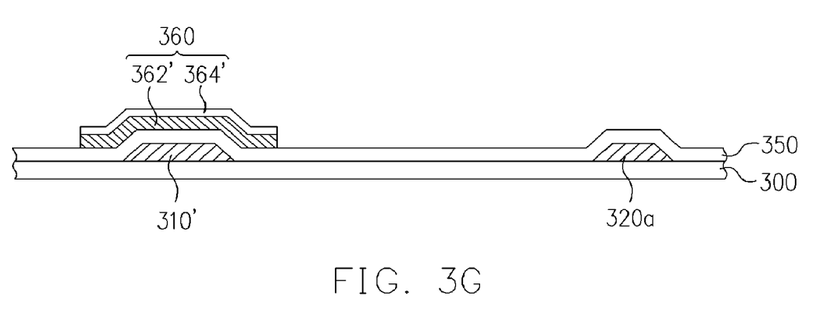

Then, a semiconductor layer 360 is defined on the gate insulating layer 350 above the gate 310', as shown in FIG. 2 and FIG. 3G. In an embodiment of the present invention, the semiconductor layer 360 includes a channel layer 362' and an ohmic contact layer 364'. The method for defining the semiconductor layer 360 on the gate insulating layer 350 above the gate 310' includes the steps as shown in FIGS. 3E-3G.

Referring to FIG. 3E, a channel material layer 362 and an ohmic contact material layer 364 are formed on the gate insulating layer 350 sequentially. The material of the channel material layer 362 is, for example, amorphous silicon, and the material of the ohmic contact material layer 364 is, for example, doped amorphous silicon. The method for forming the channel material layer 362 and the ohmic contact material layer 364 is, for example, CVD.

Then, referring to FIG. 3F, a second patterned photoresist layer R2 is formed over the channel material layer 362, the ohmic contact material layer 364 and the gate insulating layer 350 above the gate 310'. After that, an etching process E2 is carried out using the second patterned photoresist layer R2 as a mask, to remove the ohmic contact material layer 364 and the channel material layer 362 that are not covered by the second patterned photoresist layer R2, thereby patterning the semiconductor layer 360 as shown in FIG. 3G. In this embodiment, the method for removing the ohmic contact material layer 364 and the channel material layer 362 not covered by the second patterned photoresist layer R2 (i.e., the etching process E2) includes wet etching or dry etching.

Figure 3H:
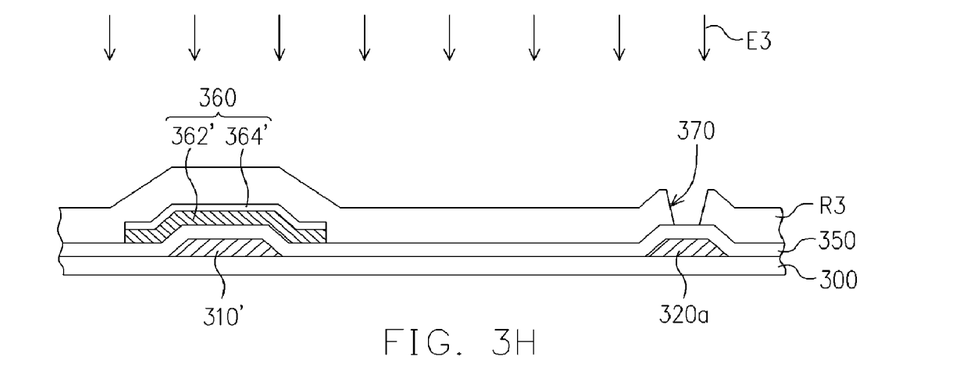
Figure 3I:
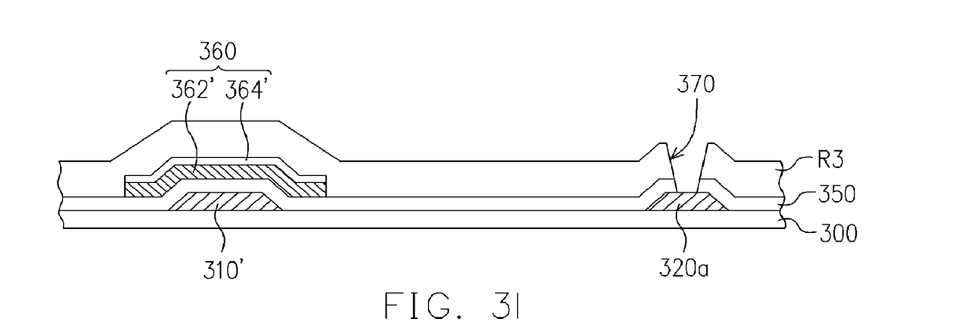

Then, the gate insulating layer 350 is patterned to expose the first terminal 320a, as shown in FIG. 3I. In an embodiment of the present invention, the method for patterning the gate insulating layer 350 to expose the first terminal 320a includes the steps shown in FIGS. 3H-3I.

First, referring to FIG. 3H, a third patterned photoresist layer R3 with an opening 370 is formed over the substrate 300. The opening 370 exposes the gate insulating layer 350 above the first terminal 320a. Then, an etching process E3 is carried out using the third patterned photoresist layer R3 as a mask, to remove the part of the gate insulating layer 350 exposed by the opening 370, thereby forming the structure as shown in FIG. 3I. After that, the third patterned photoresist layer R3 is removed.

Figure 3J:
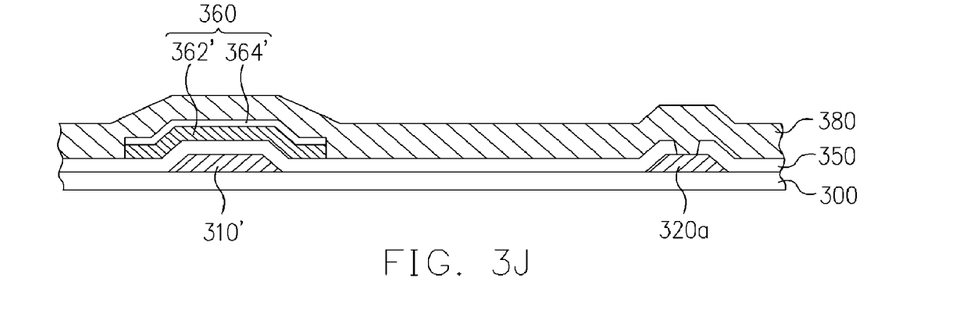

Then, a transparent conductive layer 380 is formed over the substrate 300, as shown in FIG. 3J. In this embodiment of the present invention, the method for forming the transparent conductive layer 380 over the substrate 300 includes evaporation or sputtering, and the material of the transparent conductive layer 380 is, for example, indium tin oxide (ITO) or indium zinc oxide (IZO). Particularly, the transparent conductive layer 380 as shown in FIG. 3J is electrically connected with the first terminal 320a.

Figure 3K:
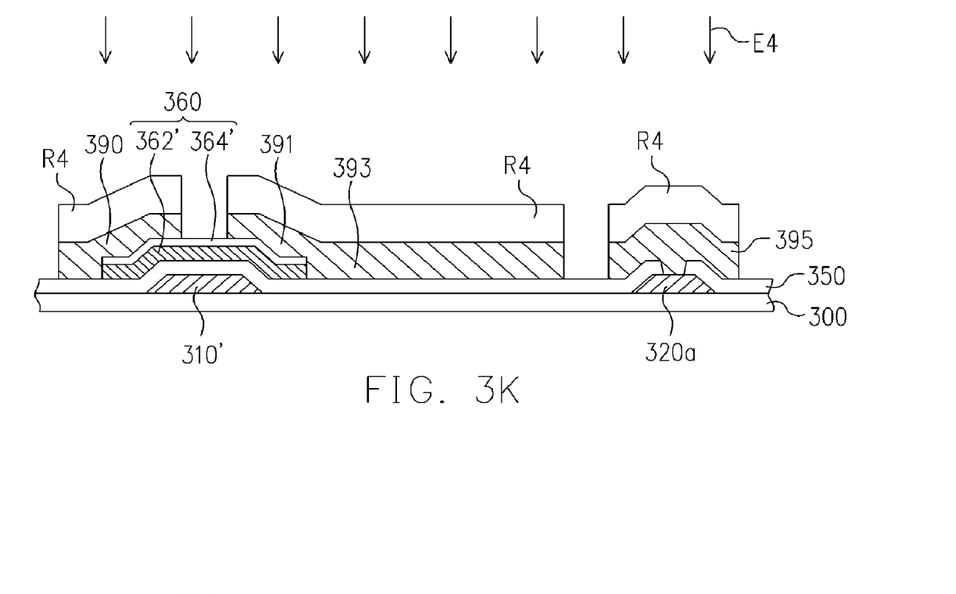

Then, a patterned photoresist layer R4 is formed on the transparent conductive layer 380, as shown in FIG. 3K. After that, referring to FIG. 2 and FIG. 3K, an etching process E4 is carried out using the patterned photoresist layer R4 as a mask to pattern the transparent conductive layer 380, so as to define a source 390, a drain 391, a data line 392 electrically connected with the source 390, a pixel electrode 393 electrically connected with the drain 391, a second terminal 394 electrically connected with the data line 392, and a contact pad 395 electrically connected with the first terminal 320a.

Figure 3L:
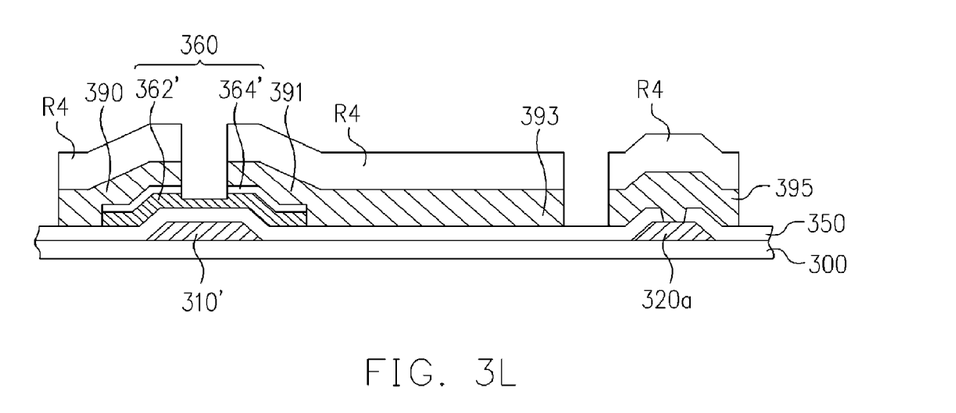
Figure 3M:
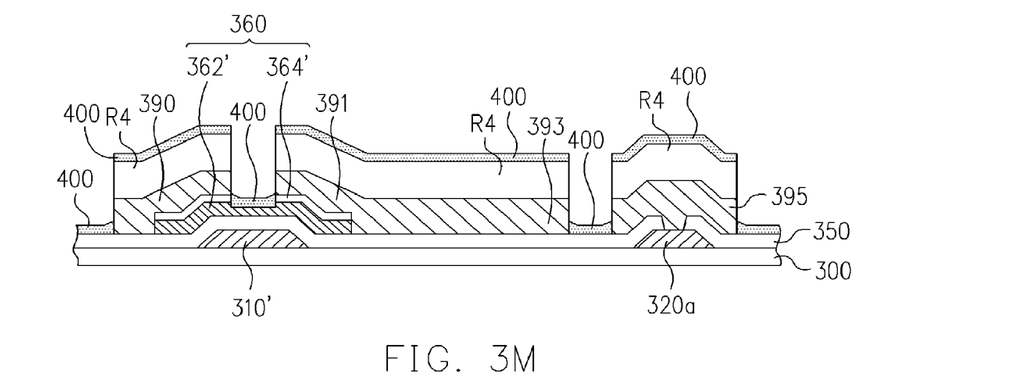
Figure 3N:
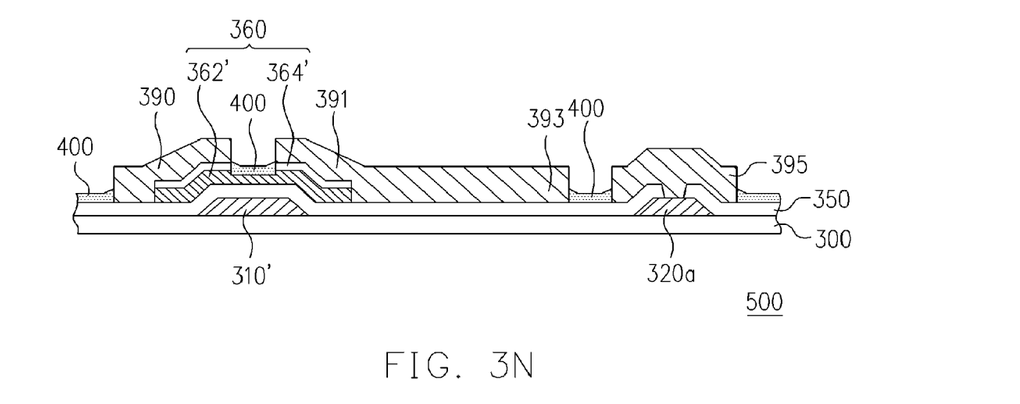

Further, according to another embodiment of the present invention, the method further includes the steps shown in FIGS. 3L-3N. As shown in FIG. 3L, after patterning the transparent conductive layer 380, the ohmic contact layer 364 sandwiched between the source 390 and the drain 391 is removed. In this way, the TFT will function as a switch. Also, in order to avoid incompletely removal of the ohmic contact layer 364, a back channel etching (BCE) process is usually carried out to remove a part of the channel layer 362'.

Then, as shown in FIG. 3M, after removing the ohmic contact layer 364 sandwiched between the source 390 and the drain 391, a protective layer 400 is formed over the substrate 300. In an embodiment, the method for forming the protective layer 400 includes the CVD, and the material of the protective layer 400 includes silicon dioxide, silicon nitride, or silicon oxynitride. It should be noted that a part of the protective layer 400 covers the channel layer 362' sandwiched between the source 390 and the drain 391 to protect the channel layer 362', and other parts of the protective layer 400 are formed on the patterned photoresist layer R4 and the gate insulating layer 350.

Next, after forming the protective layer 400 over the substrate 300, it further includes removing both the patterned photoresist layer R4 and the protective layer 400 covered on the patterned photoresist layer R4, as shown in FIG. 3N. It should be noted that, when removing the patterned photoresist layer R4, the protective layer 400 on the patterned photoresist layer R4 can also be correspondingly removed. In an embodiment, the method for removing the patterned photoresist layer R4 is, for example, stripping the photoresist using an organic solvent.

In summary, in the above method for fabricating the pixel structure, only four photomask are required for defining or patterning. The first photomask is used for defining the metal layer 310, to form the gate 310', the scan line 320, the common line 330, and the first terminal 320a (as shown in FIG. 3C). The second photomask is used for defining the semiconductor layer 360 (as shown in FIG. 3G). The third photomask is used for patterning the gate insulating layer 350, to expose the first terminal 320a (as shown in FIG. 3I). And the fourth photomask is used for patterning the transparent conductive layer 380, to define the source 390, the drain 391, the data line 392, the pixel electrode 393, the second terminal 394, and the contact pad 395 (as shown in FIG. 3K). Since the source 390, the drain 391, and the pixel electrode 393 are formed at the same time, compared with the conventional process using five photomasks, the method for fabricating the pixel structure according to the present invention need less photomasks, thereby the cost of manufacturing can be reduced. With the above method for fabricating a pixel structure, the pixel structure 500 as shown in FIG. 2 and FIG. 3N can be fabricated.

Referring to FIG. 2 and FIG. 3N, the pixel structure 500 according to the present invention includes the substrate 300, the gate 310', the scan line 320, the first terminal 320a, the gate insulating layer 350, the semiconductor layer 360, the source 390 and the drain 391, the data line 392, the pixel electrode 393, the second terminal 394, and the contact pad 395. The substrate 300 has the gate 310', the scan line 320 electrically connected with the gate 310', and the first terminal 320a electrically connected with the scan line 320 at the edge of the substrate 300 thereon. The gate insulating layer 350 covers the substrate 300. The semiconductor layer 360 is disposed on the gate insulating layer 350 above the gate 310'. The source 390 and the drain 391 are disposed above the gate insulating layer 350, and are electrically connected with the semiconductor layer 360. The data line 392 is disposed above the gate insulating layer 350, and is electrically connected with the source 390. The pixel electrode 393 is disposed above the gate insulating layer 350, and is electrically connected with the drain 391. The second terminal 394 is disposed above the gate insulating layer 350, and is electrically connected with the data line 392. The contact pad 395 is disposed above the gate insulating layer 350, and is electrically connected with the first terminal 320a. The source 390, the drain 391, the data line 392, the pixel electrode 393, the second terminal 394, and the contact pad 395 are of the same film layer. It should be noted that the gate 310', the source 390, the drain 391, and the semiconductor layer 360 together form a TFT.

Accordingly, in an embodiment of the present invention, the material of the source 390, the drain 391, the data line 392, the pixel electrode 393, the second terminal 394, and the contact pad 395 includes a transparent conductive material, e.g., ITO or IZO. Since the source 390, the drain 391, the data line 392, the pixel electrode 393, the second terminal 394, the contact pad 395 are of the same film layer and of the same material, the materials used in the manufacturing process can be reduced, and one less photomask process is needed. Therefore, the cost of manufacturing of the pixel structure 500 according to the present invention can be reduced.

In addition, as shown in FIG. 3N, the pixel structure 500 of the present invention further includes at least one protective layer 400 disposed above the gate insulating layer 350. More particularly, a part of the protective layer 400 covers the channel layer 362' sandwiched between the source 390 and the drain 391 to protect the channel layer 362'. In an embodiment, the material of the protective layer 400 is, for example, a transparent material.

Still referring to FIG. 2, in an embodiment of the present invention, the pixel structure 500 further includes a common line 330 disposed on the substrate 300 as a lower electrode of the pixel storing capacitor 340, and the pixel electrode 393 above the common line 330 is used as an upper electrode of the pixel storing capacitor 340. Therefore, the operation performance of the pixel structure 500 can be further improved.

In summary, the method for fabricating a pixel structure and the pixel structure according to the present invention have the following advantages:

(1) The fabrication method of the present invention employs four photomasks, wherein in the fourth photomask process, the source, the drain, and the pixel electrode are formed at the same time. Compared with the conventional process using five photomasks, for the method for fabricating a pixel structure of the present invention, less photomasks are required, and the processing steps thereof are simpler.

(2) The source, the drain, the data line, the pixel electrode, the second terminal, and the contact pad are of the same film layer according to the present invention. Therefore, fewer materials are used, and the cost of manufacturing can be reduced.

(3) Since the protective layer is fabricated with the existence of the patterned photoresist layer, a part of the protective layer is formed on the patterned photoresist layer. Therefore, when subsequently removing the patterned photoresist layer, the protective layer formed on the patterned photoresist layer can be correspondingly removed.

(4) The protective layer covers the channel layer sandwiched between the source and the drain. Therefore, the protective layer can protect the channel layer.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for fabricating a pixel structure, comprising:
forming a gate, a scan line, and a first terminal on a substrate, wherein the scan line is electrically connected with the gate, and the first terminal is electrically connected with the scan line at an edge of the substrate;
forming a gate insulating layer on the substrate covering the gate, the scan line, and the first terminal;
defining a semiconductor layer on the gate insulating layer above the gate;
patterning the gate insulating layer to expose the first terminal;
forming a transparent conductive layer over the substrate;
forming a patterned photoresist layer on the transparent conductive layer;
patterning the transparent conductive layer using the patterned photoresist layer as a mask, to define a source, a drain, a data line electrically connected with the source, a pixel electrode electrically connected with the drain, a second terminal electrically connected with the data line, and a contact pad electrically connected with the first terminal.

2. The method for fabricating a pixel structure as claimed in claim 1, wherein the semiconductor layer comprises a channel layer and an ohmic contact layer.

3. The method for fabricating a pixel structure as claimed in claim 2, wherein after patterning the transparent conductive layer, the ohmic contact layer sandwiched between the source and the drain is removed.

4. The method for fabricating a pixel structure as claimed in claim 3, wherein after removing the ohmic contact layer sandwiched between the source and the drain, a protective layer over the substrate is formed.

5. The method for fabricating a pixel structure as claimed in claim 4, wherein a material of the protective layer comprises silicon dioxide, silicon nitride, or silicon oxynitride.

6. The method for fabricating a pixel structure as claimed in claim 4, wherein after forming the protective layer on the substrate, the patterned photoresist layer and the protective layer covered on the patterned photoresist layer are removed.

7. The method for fabricating a pixel structure as claimed in claim 1, wherein the method for forming the gate, the scan line, and the first terminal on the substrate comprises:
forming a metal layer on the substrate;
forming a first patterned photoresist layer on the metal layer; and
carrying out an etching process using the first patterned photoresist layer as a mask, to define the gate, the scan line, and the first terminal.

8. The method for fabricating a pixel structure as claimed in claim 7, wherein a material of the metal layer is the one selected from the group consisting of Cr, W, Ta, Ti, Mo, Al, and any combination thereof.

9. The method for fabricating a pixel structure as claimed in claim 1, wherein the method for forming the gate insulating layer on the substrate comprises the chemical vapor deposition (CVD).

10. The method for fabricating a pixel structure as claimed in claim 1, wherein a material of the gate insulating layer comprises silicon dioxide, silicon nitride, or silicon oxynitride.

11. The method for fabricating a pixel structure as claimed in claim 1, wherein the method for defining a semiconductor layer on the gate insulating layer above the gate comprises:
   forming a channel material layer and an ohmic contact material layer on the gate insulating layer sequentially;
   forming a second patterned photoresist layer to cover the channel material layer and the ohmic contact material layer on the gate insulating layer above the gate; and
   removing the ohmic contact material layer and the channel material layer uncovered by the second patterned photoresist layer using the second patterned photoresist layer as a mask.

12. The method for fabricating a pixel structure as claimed in claim 11, wherein the method for removing the ohmic contact material layer and the channel material layer uncovered by the second patterned photoresist layer comprises wet etching or dry etching.

13. The method for fabricating a pixel structure as claimed in claim 1, wherein the method for patterning the gate insulating layer to expose the first terminal comprises:
   forming a third patterned photoresist layer with an opening over the substrate, and the opening exposes the gate insulating layer above the first terminal; and
   removing a part of the gate insulating layer exposed by the opening using the third patterned photoresist layer as a mask.

14. The method for fabricating a pixel structure as claimed in claim 1, wherein the method for forming the transparent conductive layer on the substrate comprises evaporation or sputtering.

15. The method for fabricating a pixel structure as claimed in claim 1, wherein the material of the transparent conductive layer comprises indium tin oxide (ITO) or indium zinc oxide (IZO).

16. The method for fabricating a pixel structure as claimed in claim 1, wherein when forming the gate, the scan line, and the first terminal, a common line is formed on the substrate as a lower electrode of a pixel storing capacitor, and the pixel electrode subsequently formed above the common line is used as an upper electrode of the pixel storing capacitor.

* * * * *